Sept. 3, 1968 R. E. BOWLING ET AL 3,400,375
UNIVERSAL CODE SYNCHRONOUS TRANSMITTER-RECEIVER DEVICE
Filed Aug. 12, 1965
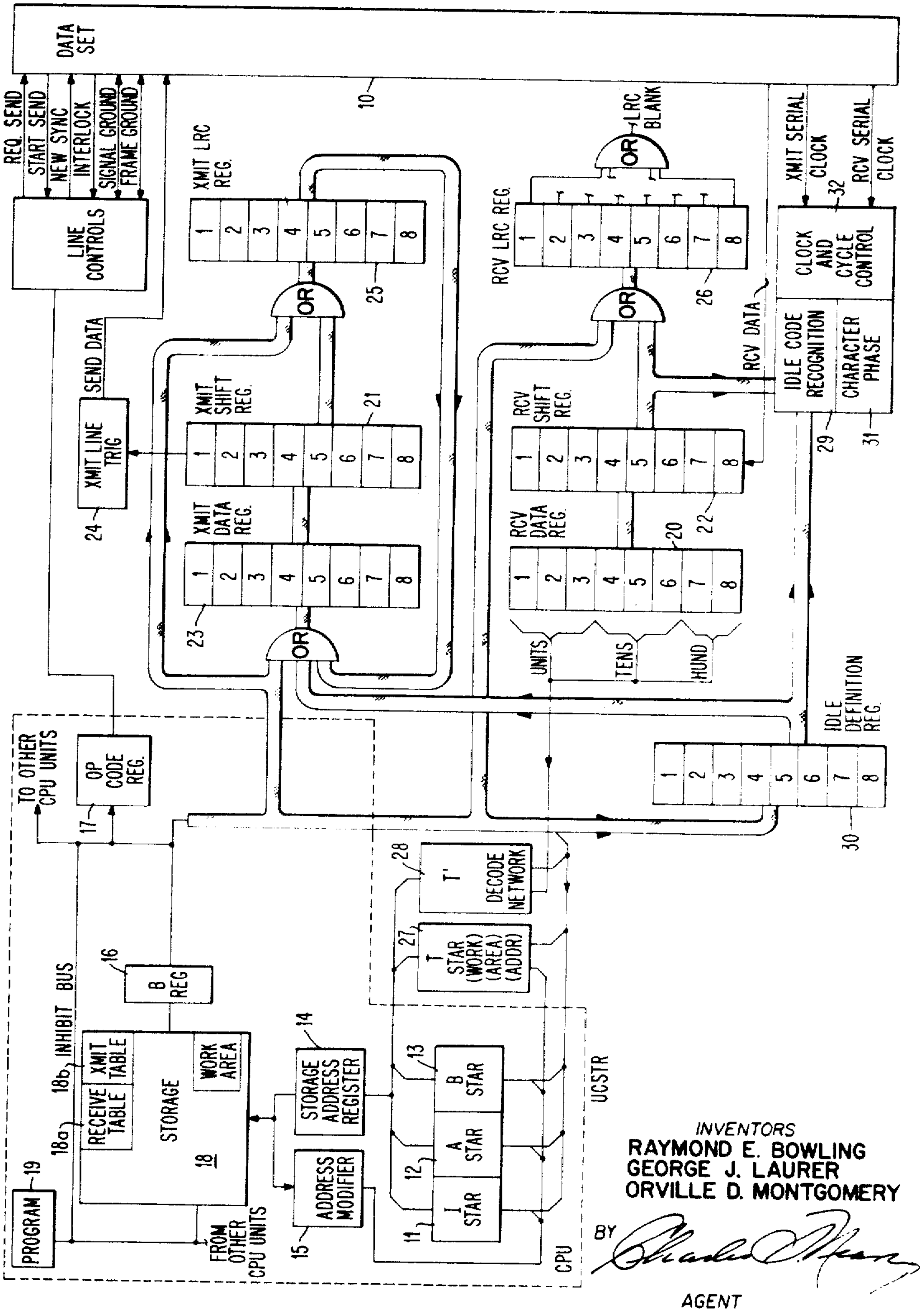
INVENTORS
RAYMOND E. BOWLING
GEORGE J. LAURER
ORVILLE D. MONTGOMERY
BY [signature]
AGENT 3,400,375

UNIVERSAL CODE SYNCHRONOUS TRANSMITTER-RECEIVER DEVICE

Raymond E. Bowling, Vestal, and George J. Laurer and Orville D. Montgomery, Endwell, N.Y., assignors to International Business Machines Corporation, Armonk, N.Y., a corporation of New York Filed Aug. 12, 1965, Ser. No. 479,199
10 Claims. (Cl. 340—172.5)

This invention pertains generally to synchronous transmitter-receiver devices and, more particularly, to improved line control means for rendering a synchronous transmitter-receiver device code compatible with other input/output units of a teleprocessing system.

In a teleprocessing system there is usually a central station comprising a data processor and the adaptive means for connecting the central station with communication lines for the purpose of transmitting data with remote stations or data terminals. However, in such systems there is an attendant limitation that the system be restricted to the use of a particular code and that all the remote terminals connected with this system must conform to the same code in order to reliably communicate with the central station. The elimination of the attendant limitation and the use of various types of input/output units with different code capabilities would greatly enhance the teleprocessing art.

Accordingly, it is the general object of the invention to provide improved line control means for rendering a synchonous transmitter-receiver device code compatible with other types of input/output units of a teleprocessing system.

It is a further object of the instant invention to provide a unique combination of line control means to provide a system that is capable of communicating with remotely located equipment and that may operate automatically in accordance with different code configurations.

It is another object of the invention to provide control means that will enable a data processor to communicate with a variety of terminals without being code sensitive.

In the prior art there are various types of data processors and digital computers wherein the data is stored in the memory system in the form of blocks. The blocks of data are recorded on a magnetic memory tape, a magnetic drum storage device, in core memory, or the like, wherein the position of each block in the storage is identified by a fixed address corresponding in each instance to a particular position of the block of data within the storage medium. When the desired fixed block address is known that address is inserted in suitable search mechanism and the system is controlled by the mechanism and circuitry to cause the block of data corresponding to that block to be read out of the storage system. In such a system, any block of data recorded in the storage medium may be rapidly selected by reference to its block address, and the selected block may be introduced to a data processor or computer which is coupled with the memory system. The block of data may then be utilized in the data processor either for computational purposes or to derive information concerning a particular message.

The code conversion device of the present invention makes use of the storage arrangements of a data processor and through the application of unique and novel line control means there is provided a new and novel means for converting information from one form to another. The embodiment of the instant invention disclosed herein is particularly adaptable for addition to a processor to render capable of operation as a teleprocessing system with communication between terminals in synchronous code, even while simultaneous input/output operations are being processed. Code compatibility is accomplished through a table look-up of equivalent information stored in storage tables of the processor. The device of the present invention is capable of doing a code conversion for both data transmitting and data receiving operations.

It is an object of this invention to provide a data processing device with improved line control means and capable of converting from one type of coded information to selectable other types of coded information.

It is another object of this invention to provide an improved line control means and data converting means through an application of table lock-up techniques.

It is a further object of this invention to provide a new and an improved device for converting data from one code configuration to another.

It is still a further object of this invention to provide a device utilizing storage addresses in the received data message for selectively finding character equivalance according to a different code.

It is still another object of this invention to provide a device which utilizes an internal address for finding character equivalence in a different code for a transmission to other equipment.

Briefly, in accordance with this invention, character information according to different code configurations are stored in portions of the storage medium of a central processor. In a transmit mode the machine control of the sending station is operative to establish connections with the station that is to serve as the receiving station. When the communication channel has been established the first character of a message is fed to the transmit data register from the main memory of the data processor. This character is used to address the transmit table in storage for the character equivalent according to the transmit code which is then transferred into a transmit data register and then sent over a data transmission line to a remote terminal. In a similar manner the subsequent characters of the message are placed in the transmit data register for the purpose of addressing the transmit table for the equivalent characters which are sent over the data transmission line in proper sequence. In a receive mode the first character of the message being received is received in the receive shift register where the serial configuration is deserialized after which it is passed into the receive data register. The character is then decoded for the purpose of addressing a receive table in storage to read out the character equivalent in accordance with the processor code and transfer it to the main data register. The character equivalent is then fed to a message assembly means and subsequent characters of the message being received on the receive data line are handled in a similar manner for the purpose of addressing the receive table for the purpose of obtaining the character equivalence of the processor code. After message assembly, the data is made available to the processor for processing operations.

The foregoing and other objects, features and advantages of the invention will be apparent from the following more particular description of a preferred embodiment of the invention, as illustrated in the accompanying drawing.

The drawing depicts a system block diagram for the line controls and code conversion device according to the present invention as utilized in combination with a data processor.

In the illustrated system, a portion of a central processing unit, hereinafter referred to as the CPU, is enclosed within the broken line at the left of the drawing. Only those areas necessary for connection with the universal code synchronous transmitter-receiver controls, hereinafter referred to as the UCSTR are shown. A data set 10 is an external unit which matches the electrical characteristics of a transmit-receive device with the electrical characteristics of the communication lines and enables attachment of a terminal with the data communication lines.

The necessary portions of the CPU are shown to comprise the I STAR 11 (Storage Address Register), A STAR 12, B STAR 13, the main STAR 14, the address modifier 15, a B register 16, an OP (operation) code register 17, and a general storage area 18 which includes the receive table 18*a* and transmit table 18*b* portions. These units interface with the UCSTR controls which comprise seven registers, timing controls, two additional STARS, a line control unit which monitors the data set and the CPU to control the flow of data, and a program section 19.

The seven UCSTR registers are composed of one special idle character definition register and two each of a data register, a shift register, and a longitudinal redundancy character (LRC) register. The idle code register 30 is used to define a line code idle character. It is to be noted that the idle character will never enter the receive data register 20 since its basic use is for synchronizing purposes only. In other words, it is essential that the timing and clocking circuits of the receiving terminal be in synchronism with the timing and clocking circuits of the transmitting terminal.

The function of the shift registers 21 and 22 is to serialize or deserialize the data, respectively. The transmit shift register 21 accepts a character parallel by bit from the transmit data register 23 and by means of shifting, the character is delivered via the transmit line trigger 24 to the data set 10 in a serial by bit manner. The receive shift register 22 accepts a character serially by bit from the data set 10 and by shifting the character is deserialized. When a received character is completely deserialized, it is delivered to the receive data register 20 parallel by bit. The LRC registers 25 and 26 can be preset to any bit configuration by the CPU from the B data register 16 and can be added to by their respective shift registers 21 and 22. The transmit LRC register 25 accumulates the LRC character for purposes of transmission at the end of a message. The receive LRC register 26 accumulates the LRC character from the data characters received from the data set 10. At the end of a message the received LRC register can be tested with a branch test for an empty (no error) condition.

The idle code recognition 29, character phase 31, and the clock and cycle control 32 units make up the timing and controls necessary for serializing and deserializing the data to and from the data set 10. The idle code recognition circuits 29 monitor the idle code register 30 and compare the shift register 22 against the character in the idle code register 30. When the idle code recognition circuits 29 recognize that a message is to be received from the communication lines, the character phase circuitry 31 will establish character synchronization for character phase with the remote station which is acting as a transmitting station. The program ability to define an idle character permits the hardware of the UCSTR to be universal in code and compatibility.

With the foregoing as a general background of information concerning the code conversion apparatus, the operation of same in accordance with arbitrary code tables will now be described. To enable operation, two tables must be loaded into fixed locations of storage, namely, the receive table containing BCD (Binary Coded Decimal) information and a transmit table containing a so-called line code which in the preferred example is a four-out-of-eight code. Other codes are equally adaptable. The table indicated below shows character and control representations in accordance with BCD and four-out-of-eight codes.

TABLE 1

[55 Characters in BCD Mode or Binary Mode]

| | REC. TABLE | | | | | | | TRANSMIT-TABLE | | | | | | | |
|---|---|---|---|---|---|---|---|---|---|---|---|---|---|---|---|
| | BCD Code | | | | | | | 4 of 8 Code | | | | | | | |
| Character | C | B | A | 8 | 4 | 2 | 1 | 1 | 2 | 4 | 8 | R | O | X | N |
| Blank | C | | | | | | | | | | | R | O | X | N |
| Space | C | A | | | | | | | 2 | 4 | 8 | | O | | |
| 0 | C | | | 8 | | 2 | | | 2 | | 8 | R | | | N |
| 1 | | | | | | | 1 | 1 | | | | | O | X | N |
| 2 | | | | | | 2 | | | 2 | | | | O | X | N |
| 3 | C | | | | | 2 | 1 | 1 | 2 | | | R | | | N |
| 4 | | | | | 4 | | | | | 4 | | | O | X | N |
| 5 | C | | | | 4 | | 1 | 1 | | 4 | | R | | | N |
| 6 | C | | | | 4 | 2 | | | 2 | 4 | | R | | | N |
| 7 | | | | | 4 | 2 | 1 | 1 | 2 | 4 | | R | | | |
| 8 | | | | 8 | | | | | | | 8 | | O | X | N |
| 9 | C | | | 8 | | | 1 | 1 | | | 8 | R | | | N |
| A | | B | A | | | | 1 | 1 | | | | R | O | X | |
| B | | B | A | | | 2 | | | 2 | | | R | O | X | |
| C | C | B | A | | | 2 | 1 | 1 | 2 | | | | O | X | |
| D | | B | A | | 4 | | | | | 4 | | R | O | X | |
| E | C | B | A | | 4 | | 1 | 1 | | 4 | | | O | X | |
| F | C | B | A | | 4 | 2 | | | 2 | 4 | | | O | X | |
| G | | B | A | | 4 | 2 | 1 | 1 | 2 | 4 | | | | | N |
| H | | B | A | 8 | | | | | | | 8 | R | O | X | |
| I | C | B | A | 8 | | | 1 | 1 | | | 8 | | O | X | |
| J | C | B | | | | | 1 | 1 | | | | R | | X | N |
| K | C | B | | | | 2 | | | 2 | | | R | | X | N |
| L | | B | | | | 2 | 1 | 1 | 2 | | | | | X | N |
| M | C | B | | | 4 | | | | | 4 | | R | | X | N |
| N | | B | | | 4 | | 1 | 1 | | 4 | | | | X | N |
| O | | B | | | 4 | 2 | | | 2 | 4 | | | | X | N |
| P | C | B | | | 4 | 2 | 1 | 1 | 2 | 4 | | | | X | |
| Q | C | B | | 8 | | | | | | | 8 | R | | X | N |
| R | | B | | 8 | | | 1 | | | | 8 | | | X | N |
| S | C | | A | | | 2 | | | 2 | | | R | O | | N |
| T | | | A | | | 2 | 1 | 1 | 2 | | | | O | | N |
| U | C | | A | | 4 | | | | | 4 | | R | O | | N |
| V | | | A | | 4 | | 1 | 1 | | 4 | | | O | | N |
| W | | | A | | 4 | 2 | | | 2 | 4 | | | O | | N |
| X | C | | A | | 4 | 2 | 1 | 1 | 2 | 4 | | | O | | |
| Y | C | | A | 8 | | | | | | | 8 | R | O | | N |
| Z | | | A | 8 | | | | 1 | | | | | O | | N |
| / | C | | A | | | | 1 | 1 | | | | R | O | | N |
| # | | | | 8 | | 2 | 1 | 1 | 2 | | 8 | R | | | |
| . | | B | A | 8 | | 2 | 1 | 1 | 2 | | 8 | | | | N |
| $ | C | B | | 8 | | 2 | 1 | 1 | 2 | | 8 | | | X | |
| , | C | | A | 8 | | 2 | 1 | 1 | 2 | | 8 | | O | | |
| @ | C | | | 8 | 4 | | | | | 4 | 8 | R | | | N |
| □ | C | B | A | 8 | 4 | | | | | 4 | 8 | | O | X | |
| * | | B | | 8 | 4 | | | | | 4 | 8 | | | X | N |
| & | C | B | A | | | | | | 2 | 4 | 8 | | | | N |
| % | | | A | 8 | 4 | | | | | 4 | 8 | | O | | N |
| - | | B | | | | | | | 2 | 4 | 8 | | | X | |
| +0 | C | B | A | 8 | | 2 | | | 2 | | 8 | | O | X | |
| -0 | | B | | 8 | | 2 | | | 2 | | 8 | | | X | N |
| RM | | | A | 8 | | 2 | | | 2 | | 8 | | O | | N |
| GM | C | B | A | 8 | 4 | 2 | 1 | 1 | | 4 | 8 | | | | N |
| Delta | | B | | 8 | 4 | 2 | 1 | 1 | | 4 | 8 | | | X | |
| SM | | | A | 8 | 4 | 2 | 1 | 1 | | 4 | 8 | | O | | |
| WS | C | | A | 8 | 4 | | 1 | | 2 | | 8 | R | | X | |
| ( | | B | A | 8 | 4 | | 1 | | 2 | 4 | | R | | X | |
| ? | | B | A | 8 | 4 | 2 | | | 2 | 4 | | R | O | | |
| ) | C | B | | 8 | 4 | | 1 | | | 4 | 8 | R | | X | |
| ; | C | B | | 8 | 4 | 2 | | | | 4 | 8 | R | O | | |
| ' | C | | A | 8 | 4 | 2 | | | 2 | | 8 | R | O | | |
| " | | | | 8 | 4 | 2 | | | 2 | 4 | 8 | R | | | |
| : | | | | 8 | 4 | | 1 | 1 | 2 | 4 | 8 | | | | |
| TM | C | | | 8 | 4 | 2 | 1 | 1 | | 4 | 8 | R | | | |

| BCD | 6 CONTROL CHARACTERS | 1 | 2 | 4 | 8 | R | O | X | N |
|---|---|---|---|---|---|---|---|---|---|
| W/M | Idle | 1 | | | 8 | R | O | | |
| W/M 5 | Inquiry/Error | 1 | | | 8 | R | | X | |
| W/M 1 | Transmit Leader | 1 | | 4 | | R | O | | |
| W/M 2 | Control Leader | 1 | | 4 | | R | | X | |
| W/M 3 | SOR 1/ACK 1 (Start of Record/Ack.). | 1 | 2 | | | R | | X | |
| W/M 4 | SOR 2/ACK 2 (Start of Record/Ack.). | 1 | 2 | | | R | O | | |
| | DUAL CHARACTERS | | | | | | | | |
| W/M 6 | TEL (Telephone) | | | 4 | 8 | R | | X | |
| W/M 7 | EOF (End of File) | | 2 | | 8 | R | | X | |
| | LRC PRESET | | | | | | | | |
| W/M 9 | TL-SOR 1 | | 2 | 4 | | | O | X | |
| W/M 0 | TL-SOR 2 | | 2 | 4 | | | | | |

*Transmit operation*

When it is desired to effect a transmit operation and the system is placed in a transmit condition, a CPU programmed move data OP code will initiate controls whereby the first character to be sent is accessed in the main work storage area 18 as defined by the T STAR 27 (work area address). A character is placed in the B data register 16 on the first machine cycle. The T STAR address is incremented by +1 and placed back in the T STAR 27 to be used later for the next succeeding address. B data register 16 character is broken down into groups of bits that define a unique address in the transmit table 18*b*. This is done by way of the T' (table address) STAR 28. By previous assignment, the line code equivalent of the BCD character is in that location. This character is read out and routed to the transmit data register 23. From the transmit data register 23 the character representation will be transferred to the transmit shift register 21 and the transmit LRC register 25. From the transmit shift register 21 the bits are read in serial fashion via the transmit line trigger 24 to the data set 10 for transmission and then to the remote terminal. The next sequential character of the message is processed in the same manner for transmission over the data transmission line to the remote terminal.

*Receive operation*

The idle code recignation circuits 29 monitor the receive shift register 22 looking for an initial idle code. Upon recognizing the idle code character, the clock in cycle controls are released to perform in a cyclic manner and the UCSTR is placed in a receive operating condition. The idle code is used to identify the particular receive table that will be used during the message receiving operation. The first message character will be received via the data set 10 and the receive data line for entrance into the receive shift register 22. The receive shift register 22 deserializes the character and a check is made to insure that it is a non-idle character after which the character is passed to the receive data register 20 and the receive LRC register 26. When the receive data register 20 has been filled the sequence of events is to break the character down into an address related to the receive table 18*a*. The T' decode circuits 28 perform this function but are actually not a storage address register, but only a set of decode circuits composed of AND circuits for the purpose of breaking the character down into different addresses related to the receive table 18*a*. The character at the address in the receive table 18*a* is then read out into the B data register 16. Another cycle is then commenced with an address from the T STAR 27 which defines the next sequential receive work area address. The taking of this cycle alters the T STAR address by +1 and the character read out of storage is suppressed. The character in the B data register 16 is then written into the main storage work area 18 wherein the message will be assembled. The subsequent characters in the message are received and processed in a similar manner. The message will be accumulated and stored in the main storage work area 18 for subsequent use by the processor.

Recapitulating, it has been shown how under the program portion of the CPU, the line control for the data communication system can be established and a message can be transmitted into a line code through the use of a transmit table and how a received message can be decoded and converted into the machine code through the use of a receive code table.

While the invention has been particularly shown and described with reference to a preferred embodiment, thereof, it will be understood by those skilled in the art that the foregoing and other changes in form and details may be made therein without departing from the spirit and scope of the invention.

We claim:

1. A data message communication system comprising:

(a) a main data terminal, (b) a plurality of remote terminals communicatively coupled with said main data terminal via communication channels, (c) program controlled means at said main data terminal for selectively rendering one of said remote terminals operative to receive data messages, (d) a data character register coupled with the communication channels, (e) message character generating means at said main data terminal, (f) a compartmentalized character storing medium for storing message character equivalents according to a line code, (g) storage address means sequentially responsive to the message characters for addressing locations in said character storing medium and causing character equivalents data to be read out of same to said data character register, and (h) means to transfer the data out of said data character register to the communication channels for transmission to the operative remote terminal.

2. A data message communication system comprising:

(a) a main data terminal, (b) a plurality of remote terminals communicatively coupled with said main terminal via communication channels, (c) control means at said main data terminal responsive to control character signals from one of said remote terminals for rendering said main data terminal operative to receive a data message, (d) a compartmentalized character storing medium for storing message character equivalents according to a predetermined code, (e) a message assembly means in said main data terminal, (f) a data character register coupled with the communication channels for receiving message characters from the channels, and (g) character decode means coupled with said data character register for decoding received message characters to selectively address locations in said character storage medium and causing character equivalents data to be read to said message assembly means.

3. A system for transmitting coded data character messages between input and output terminals by multi-bit time-position coded signals comprising:

(a) a plurality of remote data terminals, (b) a main data terminal communicatively coupled with said plurality of remote data terminals via communication lines and having:

(1) programming means for controlling the operating sequences of the main data terminal, (2) a transmit message character generating means, (3) control means responsive to said programming means for selectively rendering one of said remote terminals operative and to control the message transmission between the operating terminal and the main data terminal, (4) a compartmentalized character storage medium for storing tables of character equivalents, (5) a transmit data shift register, and (6) storage addressing means responsive to the transmit message character generating means for addressing locations in said character storage medium and transferring the character equivalents data from the selected location to the transmit data shift register for serializing the multi-bit character equivalents data for application to the communication lines.

4. A system for transmitting coded data character messages between input and output terminals by multi-bit time-position coded signals comprising:

(a) a plurality of remote data terminals, (b) a main data terminal communicatively coupled with said plurality of remote data terminals via communication lines and having:

(1) programming means for controlling the operating sequences of the main data terminal, (2) a transmit message character generating means, (3) control means responsive to said programming means for selectively rendering one of said remote terminals operative and to control the message transmission between the operating terminal and the main data terminal, (4) a compartmentalized character storage medium for storing tables of character equivalents, (5) a transmit data register, (6) storage addressing means responsive to the transmit message character generating means for addressing locations in said character storage medium and transferring the character equivalents data from the selected location to the transmit data register, (7) address modifying means for modifying the storage addresses to sequentially address other character locations in said character storage medium, and (8) a transmit data shift register coupled with said transmit data register for serializing the multi-bit character equivalents data for application to the communication lines.

5. A system for transmitting coded data character messages between input and output terminals by multi-bit time-position coded signals comprising:

(a) a plurality of remote data terminals, (b) a main data terminal communicatively coupled with said plurality of remote data terminals via communication lines and having:

(1) programming means for controlling the operating sequences of the main data terminal, (2) a transmit message character generating means, (3) control means responsive to said programming means for selectively rendering one of said remote terminals operative and to control the message transmission between the operating terminal and the main data terminal, (4) a compartmentalized character storage medium for storing tables of character equivalents, (5) a transmit data register, (6) storage addressing means responsive to the transmit message character generating means for addressing locations in said character storage medium and transferring the character equivalents data from the selected location to the transmit data register, (7) address modifying means for modifying the storage addresses to sequentially address other character locations in said character storage medium.

(8) adaptive means coupling the main data terminal with the communication lines, and (9) a transmit data shift register intermediate to said adaptive means and said transmit data register for serializing the multi-bit character equivalents data for application to the communication lines via said adaptive means.

6. A system for transmitting coded data character messages between input and output terminals by multi-bit time-position coded signals comprising:

(a) a plurality of remote data terminals, (b) a main data terminal communicatively coupled with said plurality of remote data terminals via communication lines and having:

(1) a compartmentalized character storage medium for storing tables of data character equivalents, (2) a receiving shift register for deserializing multi-bit message characters received from the communication lines, (3) received message identifying means coupled to the receiving shift register for rendering the main data terminal in operation with a transmitting remote data terminal, (4) a receive data character register coupled with said receiving shift register, (5) a message assembly means, and (6) character decode means coupled with said receive data character register for decoding message characters to selectively address locations in said character storage medium for causing the character equivalents data therein to be read out to the message assembly means.

7. A system for transmitting coded data character messages between input and output terminals by multi-bit time-position coded signals comprising:

(a) a plurality of remote data terminals, (b) a main data terminal communicatively coupled with said plurality of remote data terminals via communication lines and having:

(1) a compartmentalized character storage medium for storing tables of data character equivalents, (2) timing control means, (3) a receiving shift register for deserializing multi-bit message characters received from the communication lines, (4) received message identifying means coupled to the receiving shift register and said timing control means and operative to place the main data terminal in synchronous operation with a transmitting remote data terminal, (5) a receive data character register coupled with said receiving shift register, (6) a message assembly means, and (7) character decode means coupled with said receive data character register for decoding message characters to selectively address locations in said character storage medium for causing the character equivalents data therein to be read out to the message assembly means.

8. A system for transmitting coded data character messages between input and output terminals by multi-bit time-position coded signals comprising:

(a) a plurality of remote data terminals, (b) a main data terminal communicatively coupled with said plurality of remote data terminals and having:

(1) a compartmentalized character storage medium for storing tables of data character equivalents, (2) adaptive means coupling the main data terminal with communication lines, (3) timing control means, (4) a receiving shift register for deserializing multi-bit message characters received from the communication lines via the adaptive means, (5) received message identifying means coupled to the receiving shift register and said timing control means and operative to place the main data terminal in synchronous operation with a transmitting remote data terminal, (6) a receive data character register coupled with said receiving shift register, (7) a message assembly means, and (8) character decode means coupled with said receive data character register for decoding message characters to selectively address locations in said character storage medium for causing the character equivalents data therein to be read out to the message assembly means.

9. A system for transmitting coded data character messages between input and output terminals by multi-bit time-position coded signals comprising:

(a) a plurality of remote data terminals, (b) a main data terminal communicatively coupled with said plurality of remote data terminals via communication lines and having:

(1) programming means for controlling the operating sequences of the main data terminal, (2) a transmit message character generating means, (3) control means responsive to said programming means for selectively rendering one of said remote terminals operative and to control the message transmission between the operating terminal and the main data terminal.

(4) a compartmentalized character storage medium for storing tables of data character equivalents, (5) a transmit data register, (6) storage addressing means responsive to the transmit message character generating means for addressing locations in said character storage medium and transferring the character equivalents to data from the selected location to the transmit data register, (7) address modifying means for modifying the storage addresses to sequentially address other character locations in said character storage medium, (8) a transmit data shift register coupled with said transmit data register for serializing the multi-bit character equivalents data for application to the communication lines, (9) timing control means,

(10) a receiving shift register for deserializing multi-bit message characters received from the communication lines,

(11) reecived message identifying means coupled to the receiving shift register and said timing control means and operative to place the main data terminal in synchronous operation with a transmitting remote data terminal,

(12) a receive data character register coupled with said receiving shift register,

(13) a message assembly means, and

(14) character decode means coupled with said receive data character register for decoding message characters to selectively address locations in said character storage medium for causing the character equivalents data therein to be read out to the message assembly means.

10. A system for transmitting coded data character messages between input and output terminals by multi-bit time-position coded signals comprising:

(a) a plurality of remote data terminals, (b) a main data terminal communicatively coupled with said plurality of remote data terminals via communication lines and having:

(1) programming means for controlling the operating sequences of the main data terminal, (2) a transmit message character generating means, (3) control means responsive to said programming means for selectively rendering one of said remote terminals operative and to control the message transmission between the operating terminal and the main data terminal, (4) a compartmentalized character storage medium for storing tables of data character equivalents, (5) a transmit data register, (6) storage addressing means responsive to the transmit message character generating means for addressing locations in said character storage medium and transferring the character equivalents data from the selected location to the transmit data register, (7) address modifying means for modifying the storage addresses to sequentially address other character locations in said character storage medium, (8) adaptive means coupling the main data terminal with the communication lines, (9) a transmit data shift register intermediate to said adaptive means and said transmit data register for seralizing the multi-bit character equivalents data for application to the communication lines via said adaptive means,

(10) timing control means,

(11) a receiving shift register for deserializing multi-bit message characters received from the communication lines via the adaptive means,

(12) received message identifying means coupled to the receiving shift register and said timing control means and operative to place the main data terminal in synchronous operation with a transmitting remote data terminal,

(13) a receive data character register coupled with said receiving shift register,

(14) a message assembly means, and

(15) character decode means coupled with said received data character register for decoding message characters to selectively address locations in said character storage medium for causing the character equivalents data therein to be read out to the message assembly means.

References Cited

UNITED STATES PATENTS

| | | | |
|---|---|---|---|
| 3,208,049 | 9/1965 | Doty et al. | 340—172.5 |
| 3,268,875 | 8/1966 | Schaffer | 340—172.5 |
| 3,348,205 | 10/1967 | Lee | 340—172.5 |
| 3,354,450 | 11/1967 | Carthew et al. | 340—172.5 |

PAUL J. HENON, *Primary Examiner.*

J. P. VANDENBURG, *Assistant Examiner.*